(12) United States Patent
Yun et al.

(10) Patent No.: US 8,781,516 B2
(45) Date of Patent: Jul. 15, 2014

(54) APPARATUS AND METHOD FOR POWER CONTROL IN BROADBAND WIRELESS ACCESS SYSTEM

(75) Inventors: Yu-Suk Yun, Seoul (KR); Sung-Kwon Jo, Suwon-si (KR); Jong-Hyeuk Lee, Anyang-si (KR); Myung-Kwang Byun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 13/207,757

(22) Filed: Aug. 11, 2011

(65) Prior Publication Data

US 2012/0057623 A1 Mar. 8, 2012

(30) Foreign Application Priority Data

Sep. 6, 2010 (KR) .................. 10-2010-0086887

(51) Int. Cl.
*H04B 7/00* (2006.01)
(52) U.S. Cl.
USPC ........... 455/522; 455/501; 370/342; 370/355; 370/311
(58) Field of Classification Search
None
See application file for complete search history.

(56) References Cited

U.S. PATENT DOCUMENTS

| | | | |
|---|---|---|---|
| 6,765,883 B1 * | 7/2004 | van Heeswyk | 370/318 |
| 7,085,254 B1 * | 8/2006 | Yun et al. | 370/342 |
| 2004/0235510 A1 * | 11/2004 | Elicegui et al. | 455/522 |
| 2011/0222455 A1 * | 9/2011 | Hou et al. | 370/311 |

* cited by examiner

*Primary Examiner* — Fayyaz Alam
*Assistant Examiner* — Mohammed Rachedine
(74) *Attorney, Agent, or Firm* — Jefferson IP Law, LLP (57) ABSTRACT

Uplink power control in a broadband wireless access system is provided. A Base Station (BS) includes a controller, a first generator, a second generator, and a modulator/demodulator (modem). The controller determines to apply one of a first power control which is slot-periodic and a second power control which is frame-periodic. The first generator generates a first power control command at a slot period using a channel quality premising a rake receiver according to the first power control. The second generator generates a second power control command at a frame period using a channel quality premising an equalizer according to the second power control, and generates a third power control command according to a predefined pattern at a slot not being able to use the channel quality. The modem transmits at least one of the first, second, and third power control commands.

28 Claims, 5 Drawing Sheets

APPARATUS AND METHOD FOR POWER CONTROL IN BROADBAND WIRELESS ACCESS SYSTEM

PRIORITY

This application claims the benefit under 35 U.S.C. §119(a) of a Korean patent application filed in the Korean Intellectual Property Office on Sep. 6, 2010 and assigned Serial No. 10-2010-0086887, the entire disclosure of which is hereby incorporated by reference.

BACKGROUND OF THE INVENTION

1. Field of the Invention

The present invention relates to a broadband wireless access system. More particularly, the present invention relates to an apparatus and method for generating a command for power control in a broadband wireless access system.

2. Description of the Related Art

According to UpLink (UL) power control prescribed by the High Speed Packet Access (HSPA) standard, a Base Station (BS) transmits a Transmit Power Control (TPC) command to a terminal every slot and, according to the TPC command, the terminal increases or decreases a UL transmit power by one level. In detail, the BS compares a Signal-to-Noise Ratio (SNR) of a receive signal with a reference value. In a case where the SNR is less than the reference value, the BS transmits a TPC command to increase a transmit power and, in a case where the SNR is greater than the reference value, the BS transmits a TPC command to decrease the transmit power, thereby guaranteeing reception performance irrespective of a changing channel environment and efficiently managing power consumption of the terminal.

The reference value, which is a value for guaranteeing reception performance despite a changing channel environment, is determined in an upper layer of a system on the basis of current reception performance. For example, the reception performance is maintained in a way of, if demodulation of a receive signal has succeeded, the reference value is decreased and, if demodulation fails, the reference value is increased. The guaranteed reception performance varies according to the amount the reference value is decreased or increased.

Generally, a Wideband Code Division Multiple Access (WCDMA) system of the related art employs a rake receiver, so a power control scheme of the related art has been optimized for the rake receiver. Accordingly, a BS calculates an SNR on the assumption that a receive signal is processed by the rake receiver, compares the SNR with a reference value for guaranteeing reception performance of the rake receiver, and controls a transmit power of a terminal. Power control of the related art is carried out in a unit of one slot (i.e., 0.667 millisecond (ms)) that is a basic unit of power control as prescribed in the HSPA standard. A packet for a WCDMA service, i.e., a voice service is basically composed of a frame of a length of 10 ms, and one frame is composed of 15 slots. That is, according to the power control scheme of the related art, transmit power control is carried out 15 times during an interval of one frame.

In a case of a High Speed Uplink Packet Access (HSUPA) service, i.e., a data service, a more optimal reception method is employed in which processing is performed with an equalizer rather than a rake receiver to thereby achieve a high data rate and the like. The rake receiver allocates fingers to multi-path components, respectively, and demodulates each of the multi-path components. The equalizer performs demodulation after eliminating a multi-path component, leaving only a single-path component. Accordingly, an output SNR when receiving the same receive signal passing through a multi-path by the rake receiver and an output SNR when receiving the same by the equalizer are different from each other.

As described above, power control of the related art is carried out on the premise of a rake receiver. However, because an SNR which is used as a reference of power control is different according to the kind of the receiver, there is a need to present an alternative for performing effective power control by changing a power control scheme adaptively according to the kind of receiver employed.

SUMMARY OF THE INVENTION

Aspects of the present invention are to address at least the above-mentioned problems and/or disadvantages and to provide at least the advantages described below. Accordingly, an aspect of the present invention is to provide an apparatus and method for applying a power control scheme adaptively according to the kind of receiver employed in a broadband wireless access system.

Another aspect of the present invention is to provide an apparatus and method for performing power control optimized to an equalizer in a broadband wireless access system.

A further aspect of the present invention is to provide an apparatus and method for selecting an optimal power control scheme considering a system parameter in a broadband wireless access system.

Yet another aspect of the present invention is to provide an apparatus and method for compensating a determined Signal-to-Noise Ratio (SNR) in a broadband wireless access system.

The above aspects are addressed by providing an apparatus and method for power control in a broadband wireless access system.

In accordance with one aspect of the present invention, a Base Station (BS) apparatus in a wireless communication system is provided. The apparatus includes a controller, a first generator, a second generator, and a modulator/demodulator (modem). The controller determines to apply one of a first power control which is slot-periodic and a second power control which is frame-periodic. The first generator generates a first power control command at a slot period using a channel quality premising a rake receiver according to the first power control. The second generator generates a second power control command at a frame period using a channel quality premising an equalizer according to the second power control, and generates a third power control command according to a predefined pattern at a slot not being able to use the channel quality. The modem transmits at least one of the first, second, and third power control commands.

In accordance with another aspect of the present invention, a power control method of a BS in a wireless communication system is provided. The method includes determining to apply one of a first power control which is slot-periodic and a second power control which is frame-periodic, in a case where the first power control is selected, generating a first power control command at a slot period using a channel quality premising a rake receiver, in a case where the second power control is selected, generating a second power control command at a frame period using a channel quality premising an equalizer, and generating a third power control command according to a predefined pattern at a slot when the channel quality is unavailable, and transmitting at least one of the first, second, and third power control commands.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technology for power control in a broadband wireless access system. Below, the exemplary embodiments of the present invention describe power control, and use a Signal-to-Noise Ratio (SNR) as an example of an index representing a channel quality. However, the SNR can be replaced with the index representing the channel quality, for example, a Carrier to Interference plus Noise Ratio (CINR), a Signal to Interference plus Noise Ratio (SINR) and the like.

First, a comparison between the reception characteristics of a rake receiver and an equalizer is made as follows.

An SNR of the rake receiver is given as in Equation 1 below.

$$\gamma_{rake} = \frac{\left(\sum_{n=1}^{N} |h_n|^2\right)^2}{\sum_{n=1}^{N} |h_n|^2 \left(I_0 + \sum_{m=1, m \neq n}^{N} |h_m|^2\right)} \quad (1)$$

In Equation 1 above, the '$\gamma_{rake}$' denotes an SNR of the rake receiver, the 'N' denotes the number of multi-paths, the '$h_n$' denotes a channel coefficient of an $n^{th}$ multi-path, and the '$I_0$' denotes a thermal noise and interference component.

An SNR of the equalizer is given as in Equation 2 below.

$$\gamma_{equalizer} = \frac{|h^H R^{-1} h|^2}{h^H R^{-1} h - |h^H R^{-1} h|^2} \quad (2)$$

In Equation 2 above, the '$\gamma_{equalizer}$' denotes an SNR of the equalizer, the 'h' denotes an impulse characteristic of a channel, and the 'R' denotes a variable defined in Equation 3 below.

$$R = H \cdot H^H + N_0 \cdot I \quad (3)$$

$$H = \begin{bmatrix} h_{L-1} & h_{L-2} & \ldots & h_0 & 0 & \ldots & 0 \\ 0 & h_{L-1} & \ldots & h_1 & h_0 & \ldots & 0 \\ 0 & 0 & \ldots & h_2 & h_1 & \ldots & 0 \\ \vdots & \vdots & \ddots & \vdots & \vdots & \ddots & \vdots \\ 0 & 0 & \ldots & h_{L-2} & h_{L-3} & \ldots & 0 \\ 0 & 0 & \ldots & h_{L-1} & h_{L-2} & \ldots & h_0 \end{bmatrix}$$

In Equation 3 above, the '$N_0$' denotes a thermal noise and interference component, and the 'H' denotes a multi-path channel matrix.

Figure 1:
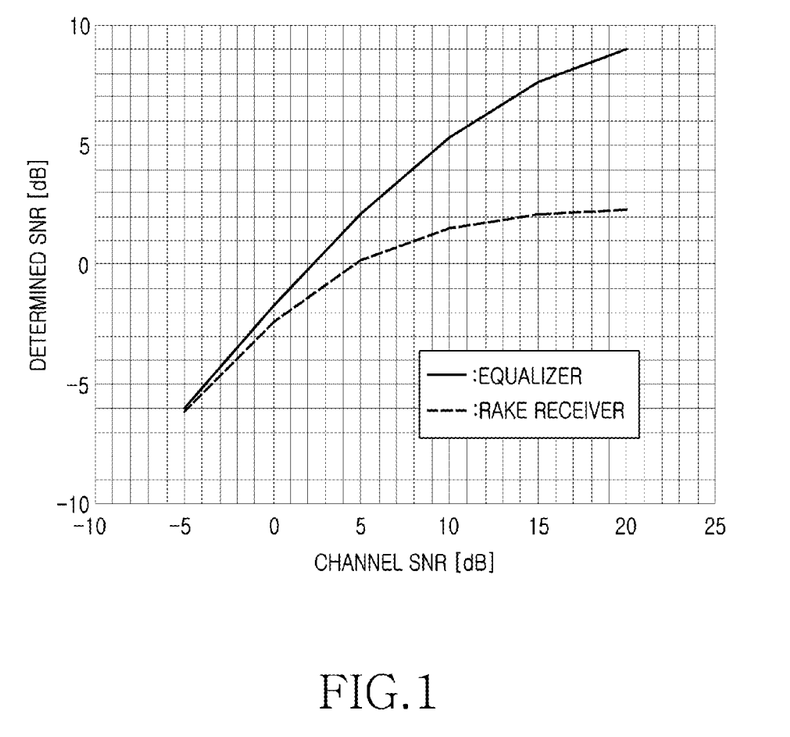
FIG. 1 is a graph illustrating Signal-to-Noise Ratios (SNRs) of a rake receiver and an equalizer in a broadband wireless access system according to an exemplary embodiment of the present invention.

A comparison of a difference between SNRs of a rake receiver and an equalizer in a multi-path channel environment is shown in FIG. 1.

FIG. 1 illustrates the SNRs of the rake receiver and the equalizer in a broadband wireless access system.

In FIG. 1, a horizontal axis denotes an actual channel SNR, and a vertical axis denotes a calculated SNR of a case of using a corresponding receiver. As illustrated in FIG. 1, there is a tendency in which, in a region of a high channel SNR, a calculated SNR of the rake receiver does not increase more than a specific value. Accordingly, in an environment transmitting a packet at a high data rate, i.e., in the region of the high channel SNR, it is desirable to perform power control on a basis of the calculated SNR of the equalizer rather than perform power control on a basis of the calculated SNR of the rake receiver.

According to the High Speed Uplink Packet Access (HSUPA) standard, a length of one packet frame can be 10 ms or 2 ms. A frame of 10 ms includes 15 slots, and a frame of 2 ms includes 3 slots. In a case of a Wideband Code Division Multiple Access (WCDMA) service (i.e., a voice service), a control signal and a data signal of a fixed data rate are transmitted all the time. For example, the control signal can be transmitted through a Dedicated Physical Control CHannel (DPCCH), and the data signal can be transmitted through a Dedicated Physical Data CHannel (DPDCH). In contrast, in a case of an HSUPA service (i.e., a data service), only in a case where there is data to be transmitted, can a data signal and a sub control signal be transmitted and, in other cases, only a control signal can be transmitted. For example, the data signal can be transmitted through an Enhanced Data CHannel (EDCH), an Enhanced-DPDCH (E-DPDCH), an EDCH DPDCH and the like, and the sub control signal can be transmitted through an E-DPCCH, an EDCH DPCCH, a DPCCH and the like.

In a power control scheme for the HSUPA service having the above feature, information of the existence or non-existence of a data signal, a data rate, an E-DPCCH and the like are used for calculating an optimal SNR during a corresponding packet interval. In an HSUPA system, the existence or non-existence of the data signal can be generally determined by, after receiving all of signals during a corresponding packet interval, demodulating an EDCH—Transport Format Combination Indication (E-TFCI) included in an E-DPCCH. If the E-TFCI is demodulated, information including transmission or non-transmission of a corresponding HSUPA packet, a packet data rate and the like is acquired. Further, a method for determining the existence or non-existence of a data signal can be various methods (e.g., a method using only a control signal) as well as a method demodulating the E-TFCI. However, the data rate is not required for calculating an SNR for power control. That is, although there is no knowledge of the data rate, SNR calculation is possible. In general, in a case of power control assuming a rake receiver, an SNR for a control signal is calculated in an environment in which there is no knowledge of the data rate.

In a case of the HSUPA service, for the sake of high-speed data transmission, a sub control signal in addition to a control signal is transmitted together. At this time, a system load resulting from the control signal can decrease by increasing power of a data signal compared to the control signal. Accordingly, in order to perform efficient power control for the HSUPA service, a new power control scheme different from power control of the related art, premising a rake receiver in consideration of reception by an equalizer, the use of the sub control signal and the like as above is demanded.

According to an uplink power control scheme on the standard, even while a packet is received, a power control command for power control should be transmitted to a terminal every slot. The power control command can be denoted as a 'TPC command'. Accordingly, according to the power control of the related art premising a rake receiver, a Base Station (BS) calculates an SNR every slot, and generates a TPC command. However, in a case of an HSUPA service, there is a difficulty in processing a receive signal by an equalizer and calculating an optimal SNR, before receiving all signals at a corresponding packet interval (i.e., an interval of 10 ms or 2 ms) and identifying the existence or non-existence of HSUPA data, a data rate, the E-TFCI demodulation result and the like. Accordingly, the exemplary embodiments of the present invention overcome the above problem of the SNR calculation and propose a way for power control optimized to the equalizer.

If an HSUPA packet is received and an E-TFCI is demodulated, the existence or non-existence of data and a data rate can be acquired. Afterward, channel estimation for an equalizer using an E-DPCCH and the like are made possible. That is, the BS cannot calculate an SNR premising the equalizer until reception of the HSUPA packet is completed. For convenience in description, the 'SNR premising equalizer' is called an 'equalizer SNR'. And, power control for a next packet interval can be carried out using the SNR calculation result.

If a slot-periodic power control scheme of the related art premising a rake receiver during a next packet interval is selected, a BS transmits a TPC command on a basis of an SNR premising the rake receiver every slot. For convenience in description, the 'SNR premising rake receiver' is called a 'rake SNR'. In contrast, if a frame-periodic power control scheme premising an equalizer during the next packet interval is selected, the BS generates a TPC command on a basis of an equalizer SNR.

At this time, in a case where frame-periodic power control is performed, it is noted that a TPC command is generated every slot, so it is different than power control timing prescribed in the standard. In this case, the exemplary embodiments of the present invention propose going with patterned power control. In detail, at an interval in which no SNR is calculated, the BS transmits a TPC command according to a predefined pattern and, if a TPC command by the SNR is generated, the BS transmits the TPC command. Here, the patterned power control represents transmitting a '+' command of increasing power or transmitting a '−' command of decreasing power according to the predefined pattern. Because the patterned power control is not based on an SNR, it is desirable that the patterned power control is defined to have a variance amount of '0' on average. For example, the pattern can be defined in a form in which the '+' command and the '−' command are iterated.

Here, whether the BS applies a frame-periodic power control scheme, i.e., a scheme of generating a TPC command at a period of 2 ms or 10 ms can be determined by at least one of HSUPA transmission or non-transmission (i.e., the existence or non-existence of a data service), an HSUPA data rate, a length of a frame, simultaneous transmission or non-transmission of voice and signaling (N_max_dpdch), the kind of a used receiver, and an operation amount of the BS. For example, in a case where a corresponding terminal is provided with only a voice service, in a case where a channel SNR is less than or equal to a reference, in a case where a data rate is less than or equal to a reference although a corresponding terminal is provided with an HSUPA service, in a case where a corresponding terminal is provided with all of a data service and a voice service, in a case where a length of a frame is greater than or equal to a reference, in a case where a receiver is a rake receiver, or in a case where a resource is insufficient for calculating an equalizer SNR because an operation amount of a BS is greater than or equal to a reference although a receiver is an equalizer, it is desirable that the BS applies slot-periodic power control premising the rake receiver. In contrast, in a case where a corresponding terminal is provided with an HSUPA packet service, in a case where a channel SNR is greater than or equal to a reference, or in a case where a receiver is an equalizer, it is desirable that the BS applies frame-periodic power control premising the equalizer. However, the aforementioned determination requirements are merely examples, and a concrete basis for determining a power control scheme can be different depending on a characteristic of a system and an intention of the system designer.

Further, a BS according to exemplary embodiments of the present invention can provide frame-periodic power control premising a rake receiver. A rake SNR can be calculated every slot unit, so in a case of premising the rake receiver, slot-periodic power control is possible. However, in the course of performing frame-periodic power control using an equalizer, in a case where there is a need to change a receiver into a rake receiver according to a change of a channel environment, an operation amount of the BS and the like, changing a period of power control together can cause a great burden of a scheduling operation. And, when considering a possibility of again changing the receiver into the equalizer, it can be effective to maintain frame-periodic power control despite currently using the rake receiver. Accordingly, the BS can provide the frame-periodic power control premising the rake receiver to a terminal that temporarily uses the rake receiver. At this time, in a case where the frame-periodic power control premising the rake receiver is carried out, the BS does not generate a TPC command every slot despite using the rake receiver. So, it should go with the patterned power control. Further, in order to reduce a burden of operation of an equalizer SNR, the BS can apply power control using a rake SNR despite using an equalizer for a corresponding terminal. If the rake SNR is used, power control optimized to the equalizer is not performed, so efficiency decreases. Although so, power control of an operable range is accomplished.

Figure 2:
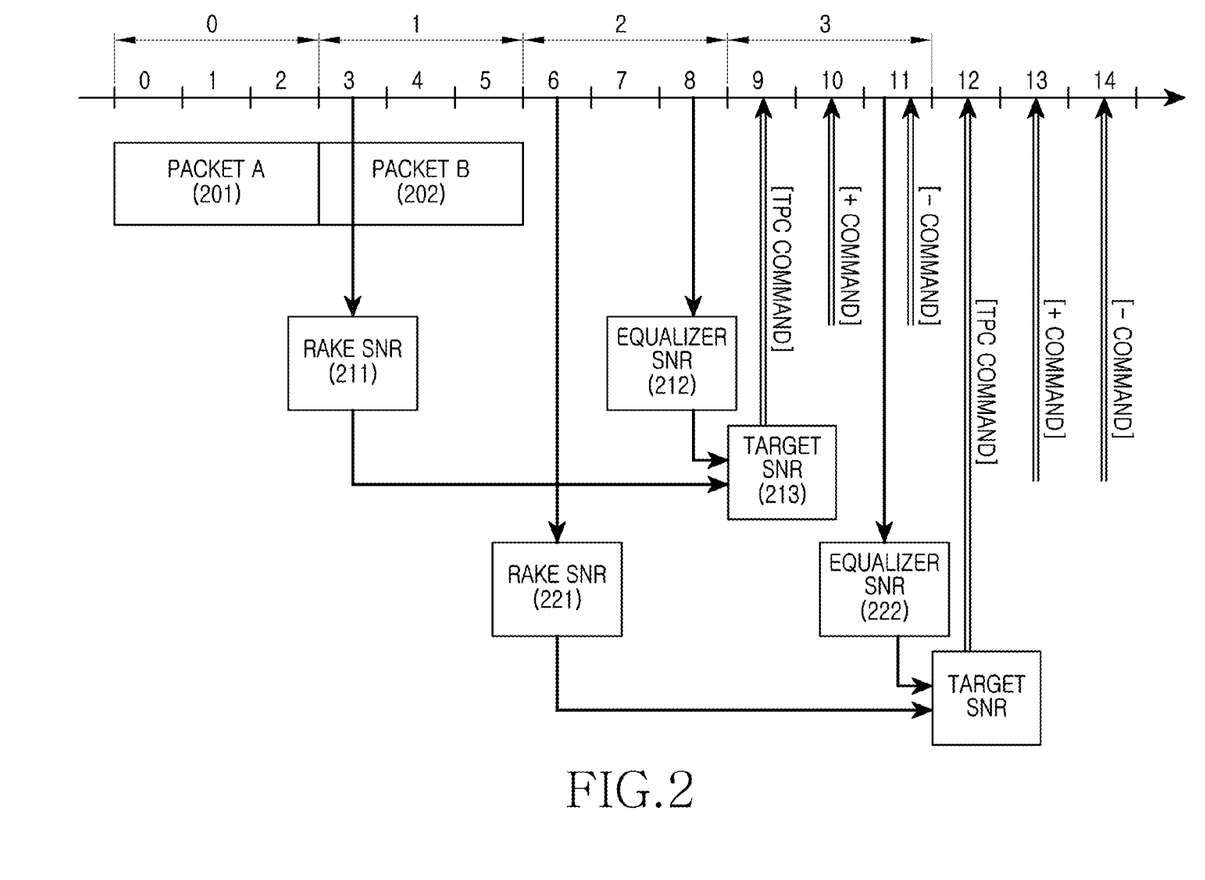
FIG. 2 is a diagram illustrating an example of power control in a broadband wireless access system according to an exemplary embodiment of the present invention.

FIG. 2 illustrates an example of power control in a broadband wireless access system according to an exemplary embodiment of the present invention. FIG. 2 illustrates an example of transmission of a power control command (e.g., a TPC command) of a case where frame-periodic power control is performed.

Referring to FIG. 2, one scale of a progress axis denotes one slot, and three slots denote a frame. A packet of a frame of 2 ms is transmitted through 3 slots. A rake SNR 211 and equalizer SNR 212 for a packet A 201 received at frame0 can be calculated at different times, respectively. In a case of FIG. 2, the rake SNR 211 and equalizer SNR 212 for the packet A 201 received at frame0 are calculated at slot3 and slot8, respectively. In other words, FIG. 2 assumes that an operation delay for calculation of an equalizer SNR is five slots. Here, concrete timing and operation delay for the SNR calculation can be different depending on a structure of a system, an operation method and the like.

In a case where frame-periodic power control is performed, the rake SNR 211 and the equalizer SNR 212 are each compared with a reference value that is a power control reference, i.e., a target SNR 213. And then, TPC commands are generated according to the respective comparison results. Among the TPC commands, a TPC command corresponding to a used receiver is transmitted at a slot9.

A rake SNR 221 and equalizer SNR 222 for a packet B 202 received at frame1 is calculated at sloth and slot11, respectively, and a TPC command determined using the packet B 202 is transmitted at slot12. Accordingly, TPC commands to be transmitted at slot10 and slot11 are not generated, so TPC commands according to patterned power control are transmitted during an interval of slot10 and slot11. In FIG. 2, a '+' command and a '−' command are transmitted alternately. Here, a TPC command pattern of the patterned power control can be different according to a given exemplary embodiment.

In the exemplary embodiment illustrated in FIG. 2, despite the fact that only one TPC command is transmitted, a rake SNR and an equalizer SNR are all calculated. However, according to another exemplary embodiment of the present invention, a BS can previously determine an SNR to be applied, and calculate only one SNR corresponding to the determination among a rake SNR and an equalizer SNR.

Because the HSUPA service has a feature of a high data rate, the HSUPA service achieves the power control in a state where its serviced channel SNR is higher than that of the WCDMA service. In a state where the channel SNR is low, an intensity of a transmit power of a terminal and a determined SNR are in a direct proportional relationship. But, there is a trend that the determined SNR is saturated in an environment of a high channel SNR. The saturation trend of the determined SNR is confirmed through FIG. 3 below.

Figure 3:
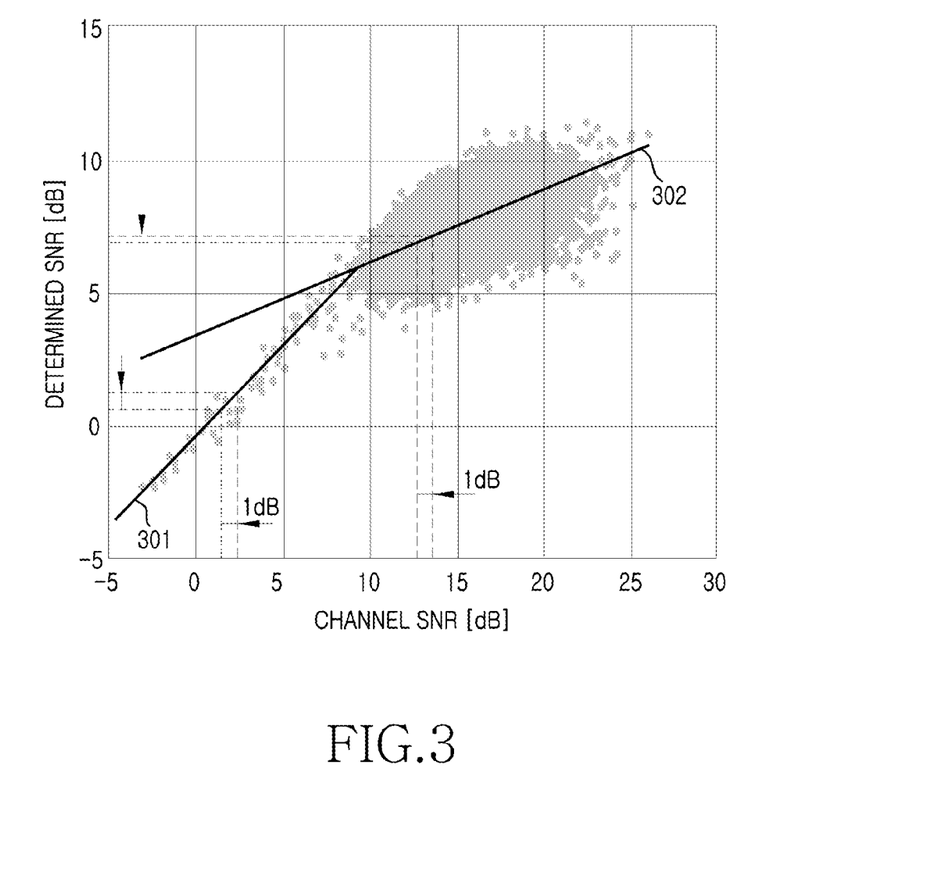
FIG. 3 is a graph illustrating the relationship between a channel SNR and a determined SNR in a broadband wireless access system according to an exemplary embodiment of the present invention.

FIG. 3 illustrates the relationship between a channel SNR and a determined SNR in a broadband wireless access system according to an exemplary embodiment of the present invention.

Referring to FIG. 3, an X-axis denotes the channel SNR, and a Y-axis denotes the determined SNR. In a graph of FIG. 3, dots represent SNRs determined in an environment of an actual channel SNR, and straight lines 301 and 302 represent average ratios. It is identified that the straight line 301 of a region of a low channel SNR and the straight line 302 of a region of a high channel SNR are different in slope from each other. That is, according to FIG. 3, in the region of the low channel SNR, if a transmit power of a terminal increases 1 decibel (dB), a determined SNR increases 1 dB. Unlike this, in the region of the high channel SNR, a direct proportional relationship is not met, so the determined SNR increases less than 1 dB although the transmit power of the terminal increases 1 dB.

According to the related art, a reference value of an SNR for guaranteeing constant reception performance increases or decreases in a size of a defined unit according to reception performance. In a case where the reference value varies in the size of the defined unit irrespective of a channel SNR, in a channel environment in which no direction proportional relationship is met, an amount of variation of a transmit power of a terminal increases more than in a channel environment of an SNR in which a direction proportional relationship is met. Accordingly, for power control for an HSUPA service, there is a need to compensate for the relationship of a determined SNR dependent on a channel SNR, or there is a need to control a variation amount of a reference value adaptively according to the channel SNR.

According to the related art, if demodulation of a receive signal fails, a reference value increases by $\Delta$dB and, if demodulation succeeds, the reference value decreases by $(1/N) \times \Delta$dB. Due to this, a demodulation error probability can be maintained as $1/(N+1)$. However, as described above, applying a unit size $\Delta$ of a variation of the reference value according to a channel SNR becomes a method for efficiently managing a variation amount of a transmit power of a terminal. Further, in addition to a method for applying the unit size variably according to the channel SNR, by inversely compensating the determined SNR, the same effect can be obtained. Here, the method of inversely compensating the determined SNR is given as follows.

First, an equation of an average ratio of a channel SNR and a determined SNR of FIG. 3 above is obtained through a simulation, a field test and the like. The equation of the average ratio includes at least one or more independent equations according to a channel SNR value or a determined SNR value. Afterward, when performing power control, a BS selects a straight line corresponding to an SNR determined in a power control process and then, calculates a channel SNR using both an equation of the selected straight line and the determined SNR. At this time, the determined channel SNR is a compensated SNR. Accordingly, the BS compares the compensated SNR and a reference value to generate a TPC command.

Figure 4:
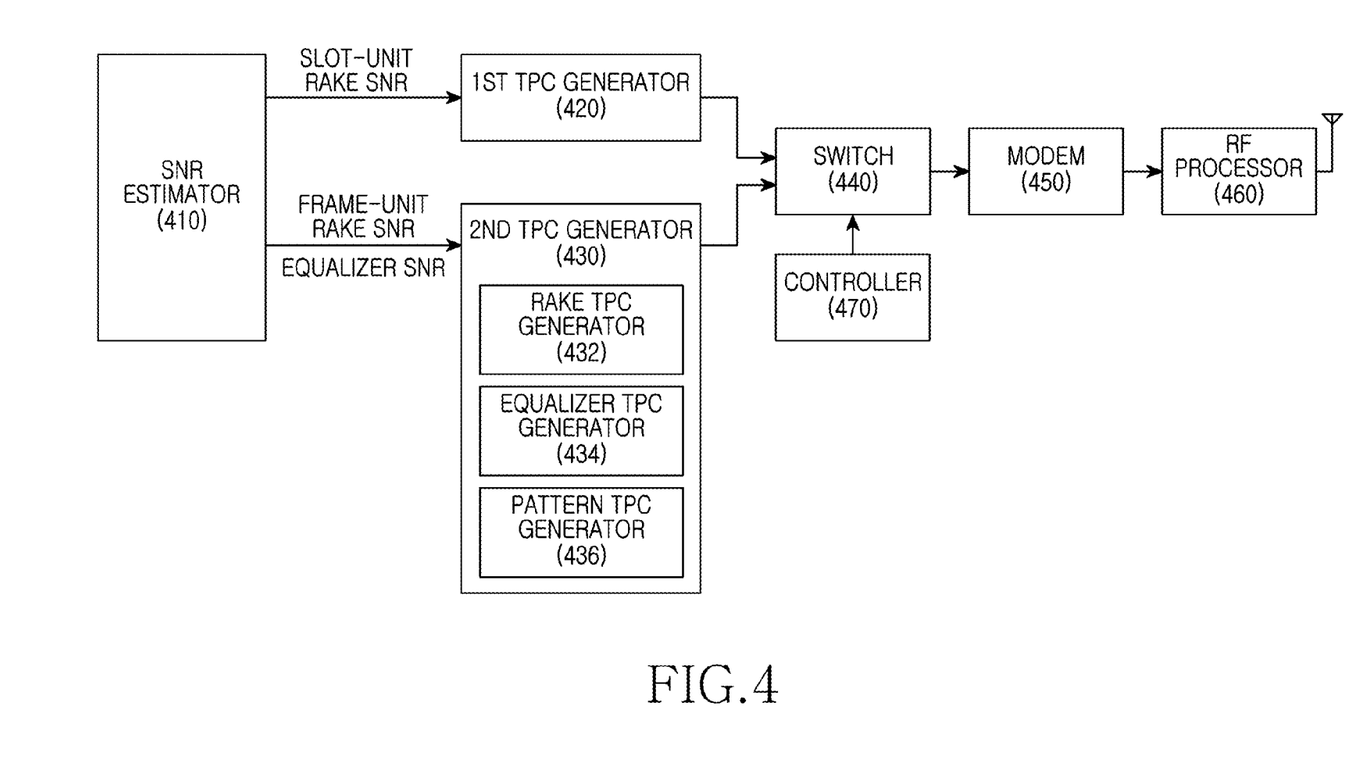
FIG. 4 is a block diagram illustrating a construction of a Base Station (BS) in a broadband wireless access system according to an exemplary embodiment of the present invention.

FIG. 4 illustrates a construction of a BS in a broadband wireless access system according to an exemplary embodiment of the present invention.

Referring to FIG. 4, the BS includes an SNR estimator 410, a first TPC generator 420, a second TPC generator 430, a switch 440, a modulator/demodulator (modem) 450, a Radio Frequency (RF) processor 460, and a controller 470.

The SNR estimator 410 calculates an SNR of each of terminals using uplink signals of the terminals. For example, the SNR estimator 410 calculates a rake SNR every slot, and calculates at least one of a frame average rake SNR and an equalizer SNR every frame. For example, the SNR can be calculated as in Equation 1 and Equation 2 above. And, the SNR estimator 410 provides the slot-unit rake SNR to the first TPC generator 420, and provides the at least one of the frame-unit rake SNR and the equalizer SNR to the second TPC generator 430.

The first TPC generator 420 receives a slot-unit rake SNR from the SNR estimator 410, and generates a TPC command every slot using the slot-unit rake SNR. In detail, the first TPC generator 420 compares the slot-unit rake SNR with a reference value and, according to the comparison result, generates a '+' command or a '−' command. For instance, if the slot-unit rake SNR is higher than the reference value, the '−' command can be generated and, if the slot-unit rake SNR is lower than the reference value, the '+' command can be generated. Here, the reference value can be a variable changing according to a channel environment (i.e., an SNR).

The second TPC generator 430 receives a frame-unit rake SNR and equalizer SNR from the SNR estimator 410, and generates an SNR-based TPC command at a frame period using the frame-unit rake SNR and equalizer SNR. Further, while the SNR is not provided, the second TPC generator 430 generates a TPC command according to a predefined pattern. Here, a length of the frame can be 2 ms, 10 ms or another length in time.

In detail, the second TPC generator 430 includes a rake TPC generator 432, an equalizer TPC generator 434, and a pattern TPC generator 436. The rake TPC generator 432 and the equalizer TPC generator 434 generate TPC commands at a frame period. For example, a length of a frame can be 2 ms, 10 ms or another length in time. In detail, the rake TPC generator 432 and the equalizer TPC generator 434 compare a rake SNR and an equalizer SNR with reference values, respectively, and generate TPC commands independently, respectively. At this time, the respective reference values of the rake TPC generator 432 and the equalizer TPC generator 434 can be the same value or values determined independently of each other. Further, the respective reference values of the rake TPC generator 432 and the equalizer TPC generator 434 can be either the same value as the reference value of the first TPC generator 420 or independent values.

In addition, prior to generating the TPC commands, the rake TPC generator 432 and the equalizer TPC generator 434 can compensate a frame-unit rake SNR or equalizer SNR provided from the SNR estimator 410. In other words, the rake TPC generator 432 and the equalizer TPC generator 434 select an SNR equation of a range including a value of a determined SNR provided from the SNR estimator 410, and calculate a channel SNR using the selected SNR equation. And, the rake TPC generator 432 and the equalizer TPC generator 434 generate TPC commands using the channel SNR. That is, the channel SNR is a compensated value of the determined SNR. Here, the equation, which may be a statistic equation determined in advance through a simulation, a field test and the like, can exist in plural according to division of a range of an SNR. For instance, the equation may be a linear equation, as illustrated in FIG. 3.

The pattern TPC generator 436 generates a TPC command to be transmitted at slots where no TPC commands are generated by the rake TPC generator 432 and the equalizer TPC generator 434. That is, at the slots where TPC commands based on the determined SNR are not generated, the pattern TPC generator 436 generates a TPC command according to a predefined pattern. A power control scheme presented in the HSUPA standard is for transmitting a TPC command at a period of 1 slot, i.e., at a period of 0.667 ms, thereby controlling a transmit power of a terminal every slot. So, in a case where it is only by the rake TPC generator 432 or the equalizer TPC generator 434, power control timing is different than the power control timing employed in the standard. Accordingly, to observe the HSUPA standard, the pattern TPC generator 436 generates a TPC command according to a predefined pattern instead of using an SNR. The predefined pattern can be different according to a system characteristic and an intention of a system designer. However, because the TPC command generated by the pattern TPC generator 436 is not based on an SNR, it is desirable that the TPC command is defined to have a variance amount of '0' on average. For example, the predefined pattern can be defined in a form in which a '+' command and a '−' command are iterated.

As described above, the second TPC generator 430 generates a TPC command at a frame period through the rake TPC generator 432 or the equalizer TPC generator 434 and, while no TPC command is generated by the rake TPC generator 432 and the equalizer TPC generator 434, the second TPC generator 430 generates a TPC command through the pattern TPC generator 436. As a result, the TPC command is output every slot. Here, the output of the second TPC generator 430 follows the control of the controller 470.

The switch 440 outputs one of TPC commands from the first TPC generator 420 and the second TPC generator 430 according to the control of the controller 470. The modem 450 performs baseband processing, for example, coding, modulating, code spreading and the like for the TPC command provided through the switch 440 according to the system standard. The RF processor 460 up-converts a signal provided from the modem 450 into an RF band signal and then, transmits the RF band signal through an antenna.

The controller 470 controls output of the second TPC generator 430 and output of the switch 440. That is, the controller 470 determines an optimal power control scheme using a system parameter, and controls the output of the second TPC generator 430 and the output of the switch 440 to transmit a TPC command according to the optimal power control scheme.

For instance, the controller 470 can control the switch 440 according to HSUPA transmission or non-transmission, an HSUPA data rate, a length of a frame, simultaneous transmission or non-transmission of voice and signaling (N_max_d-pdch), the kind of a receiver employed, an operation amount of the BS and the like. In detail, in a case where a corresponding terminal is provided with only a voice service, in a case where a channel SNR is less than or equal to a reference, in a case where a data rate is less than or equal to a reference although a corresponding terminal is provided with an HSUPA service, in a case where a corresponding terminal is provided with all of a data service and a voice service, in a case where a length of a frame is greater than or equal to a reference, in a case where a receiver is a rake receiver, or in a case where a resource is insufficient for calculating an equalizer SNR because an operation amount of the BS is greater than or equal to a reference although a receiver is an equalizer, the controller 470 can control to output a TPC command generated by the first TPC generator 420. In contrast, in a case where a corresponding terminal is provided with an HSUPA packet service, in a case where a channel SNR is greater than or equal to a reference, or in a case where a receiver is an equalizer, the controller 470 can control to output a TPC command generated by the second TPC generator 430. In detail, in an environment of a case where a length of a frame is equal to 2 ms (TTI=2 ms), a case where a reception E-TFCI value is greater than or equal to a reference value (E-TFCI_ILPC) preset to a system parameter (E-TFCI>E-TFCI_ILPC), a case where there is no voice and signaling signal transmitted simultaneously (N_max_dpdch=0) and the like, the controller 470 can determine to transmit a TPC command generated by the second TPC generator 430. Here, the HSUPA transmission or non-transmission and the HSUPA data rate can be determined on the basis of a reception E-TFCI value and a length of a frame. The E-TFCI, which is a value prescribed by the HSUPA standard, represents a data amount transmitted by an HSUPA channel. Also, the simultaneous transmission or non-transmission of the voice and signaling has been set in the standard, and can be determined by a value of 'N_max_dpdch' determined in a process of setting an HSUPA service between the BS and a terminal.

Further, the controller 470 can control the second TPC generator 430 according to equalizer information, i.e., equalizer use or non-use, power control timing, frame-unit SNR determination completion or non-completion (SNR ready information) and the like. That is, in a case where a TPC command based on an SNR cannot be generated because a frame-unit SNR is not calculated, the controller 470 controls to output a TPC command generated by the pattern TPC generator 436. And, in a case where the TPC command based on the SNR can be generated because the frame-unit SNR is calculated, the controller 470 controls to output a TPC command generated by the rake TPC generator 432 or the equalizer TPC generator 434. Here, a case of outputting a TPC command generated by the rake TPC generator 432 is a case of intending to use a rake SNR temporarily in a course of generating a TPC command using an equalizer SNR. For instance, in a case of temporarily using a rake receiver so as to decrease an operation amount due to a burden of a reception operation amount of the BS, or in a case of using an equalizer but having to temporarily decrease an operation amount due to a burden of an operation amount of SNR determination, the rake SNR can be used temporarily.

In a construction of the BS described with reference to FIG. 4, the first TPC generator 420 and the second TPC generator 430 generate TPC commands based on each power control scheme irrespective of control of the controller 470. That is, according to an exemplary embodiment of the present invention, the BS previously generates all of the TPC commands based on each power control scheme and then, transmits a TPC command corresponding to a selected power control scheme. However, according to another exemplary embodiment of the present invention, only a TPC command corresponding to a selected power control scheme can be generated. In this case, the controller 470 controls not output of the first TPC generator 420 and the second TPC generator 430 but TPC command generation or non-generation, and the first TPC generator 420 and the second TPC generator 430 generate TPC commands according to the control of the controller 470.

Figure 5:
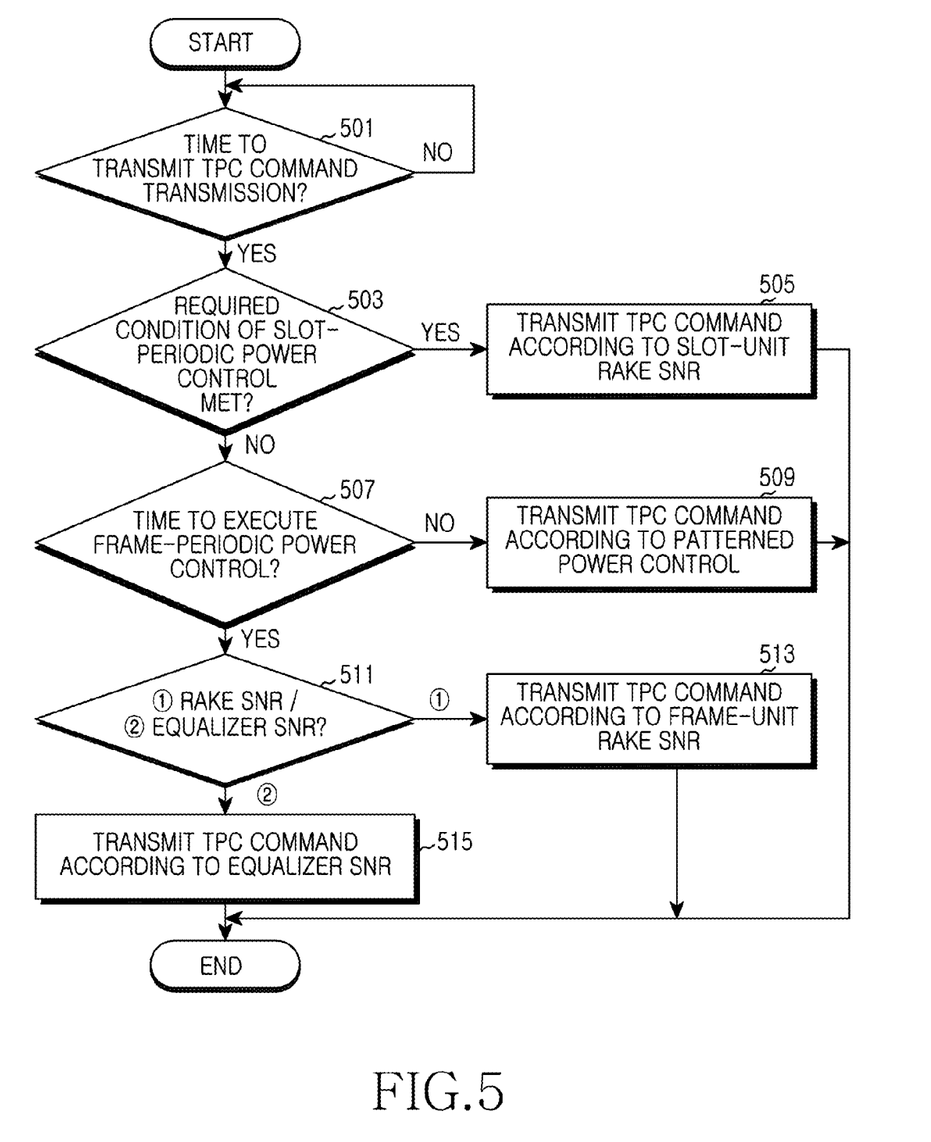
FIG. 5 is a flowchart illustrating a power control procedure of a BS in a broadband wireless access system according to an exemplary embodiment of the present invention.

FIG. 5 illustrates a power control procedure of a BS in a broadband wireless access system according to an exemplary embodiment of the present invention.

Referring to FIG. 5, in step 501, the BS determines if a time for transmission of a TPC command has arrived. On the HSUPA standard, the TPC command should be transmitted every slot.

If it is determined in step 501 that the time for transmission of the TPC command has arrived, the BS proceeds to step 503 and determines if a required condition of slot-periodic power control is met. In other words, the BS determines whether to apply a slot-periodic power control scheme or whether to apply a frame-periodic power control scheme. In detail, the BS can determine whether to apply the slot-periodic power control scheme or whether to apply the frame-periodic power control scheme, according to HSUPA transmission or non-transmission, an HSUPA data rate, a length of a frame, simultaneous transmission or non-transmission of voice and signaling, the kind of a used receiver, an operation amount of the BS and the like. For instance, in a case where a corresponding terminal is provided with only a voice service, in a case where a channel SNR is less than or equal to a reference, in a case where a data rate is less than or equal to a reference although a corresponding terminal is provided with an HSUPA service, in a case where a corresponding terminal is provided with all of a data service and a voice service, in a case where a length of a frame is greater than or equal to a reference, in a case where a receiver is a rake receiver, and in a case where a resource is insufficient for calculating an equalizer SNR because an operation amount of the BS is greater than or equal to a reference although a receiver is an equalizer, the BS selects the slot-periodic power control scheme. In contrast, in a case where a corresponding terminal is provided with an HSUPA packet service, in a case where a channel SNR is greater than or equal to a reference, or in a case where a receiver is an equalizer, the BS selects the frame-periodic power control scheme. In detail, in an environment of a case where a length of a frame is equal to 2 ms (TTI=2 ms), a case where a reception E-TFCI value is greater than or equal to a reference value (E-TFCI_ILPC) preset to a system parameter (E-TFCI>E-TFCI_ILPC), a case where there is no voice and signaling signal transmitted simultaneously (N_max_dpdch=0) and the like, the BS can select the frame-periodic power control scheme.

If it is determined in step 503 that the required condition of the slot-periodic power control is met, the BS proceeds to step 505 and transmits a TPC command determined using a slot-unit rake SNR. At this time, the BS can transmit the TPC command previously generated before the determination of step 505, or generate the TPC command after the determination of step 505.

In contrast, if the required condition of the slot-periodic power control is not met, the BS proceeds to step 507 and determines if it is time to execute frame-periodic power control. That is, the frame-periodic power control is performed in a frame unit, so a TPC command is transmitted only at one slot per frame. Accordingly, the BS determines if it is a slot to transmit a TPC command according to the frame-periodic power control. For instance, the BS determines which SNR to use according to equalizer information, i.e., equalizer use or non-use, power control timing, frame-unit SNR determination completion or non-completion (SNR ready information) and the like. That is, in a case where a TPC command based on an SNR cannot be generated because a frame-unit SNR is calculated, the BS determines that it is not the time to execute the frame-periodic power control.

If it is determined in step 507 that it is not the time to execute the frame-periodic power control, the BS proceeds to step 509 and transmits a TPC command according to patterned power control. In other words, the BS transmits a TPC command according to a predefined pattern. At this time, the BS can transmit the TPC command previously generated before the determination of step 507, or generate the TPC command after the determination of step 507.

In contrast, if it is determined in step 507 that it is the time to execute the frame-periodic power control, the BS proceeds to step 511 and determines if the BS uses a rake SNR or uses an equalizer SNR. Here, a case of using the rake SNR is a case of intending to use the rake SNR temporarily in the course of generating a TPC command using an equalizer SNR. For example, in a case of temporarily using a rake receiver so as to decrease an operation amount due to a burden of a reception operation amount of the BS or in a case of using an equalizer but having to temporarily decrease an operation amount due to a burden of an operation amount of SNR determination, the rake SNR can be used temporarily.

If it is determined in step 511 that the rake SNR is used, the BS proceeds to step 513 and transmits a TPC command according to the rake SNR. At this time, the BS can transmit the TPC command previously generated before the determination of step 511, or generate the TPC command after the determination of step 511.

In contrast, in a case where it is determined in step 511 that the equalizer SNR is used, the BS proceeds to step 515 and transmits a TPC command according to the equalizer SNR. At this time, the BS can transmit the TPC command previously generated before the determination of step 511, or generate the TPC command after the determination of step 511.

FIG. 5 illustrates a procedure of transmission of a TPC command according to power control of a BS according to an exemplary embodiment of the present invention, but does not illustrate a step of generating the TPC command. According to an exemplary embodiment of the present invention, after TPC commands according to each power control scheme are all previously generated before the determination of steps 503, 507, and 511, they can be transmitted selectively according to the determination. In contrast, according to another exemplary embodiment of the present invention, after the determination of steps 503, 507, and 511, only a TPC command corresponding to the determination result can be generated.

Further, although not illustrated in FIG. 5, in an additional step, the BS can compensate a determined SNR using the relationship between an actual channel SNR and the determined SNR. That is, the BS can select an equation corresponding to an SNR value, calculate a channel SNR using the selected equation, and use the channel SNR as a compensated channel quality.

Exemplary embodiments of the present invention selectively apply a power control scheme depending on the existence or non-existence of a data service, a data rate and the like, thereby being capable of performing power control optimized to a receiver.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A Base Station (BS) apparatus in a wireless communication system, the apparatus comprising:

a controller for determining to apply one of a first power control in which power control commands are slot-periodically generated without information determined after receiving a frame and a second power control in which power control commands are frame-periodically generated based on the information determined after receiving the frame;

a first generator for generating a first power control command at a slot period using a channel quality premising a rake receiver according to the first power control;

a second generator for generating a second power control command at a frame period using a channel quality premising an equalizer according to the second power control, and for generating a third power control command according to a predefined pattern at a slot when the channel quality is unavailable; and a modulator/demodulator (modem) for transmitting at least one of the first, second, and third power control commands.

2. The apparatus of claim 1, wherein the first power control is power control using the channel quality calculated premising the rake receiver, and wherein the second power control is power control using the channel quality calculated premising the equalizer.

3. The apparatus of claim 2, wherein the controller selects one of the first power control and the second power control according to at least one of the existence or non-existence of a data service, a data rate, a length of a frame, simultaneous transmission or non-transmission of voice and signaling, the kind of a receiver employed, and an operation amount of a BS.

4. The apparatus of claim 3, wherein the controller selects the first power control, if a corresponding terminal is provided with only a voice service, if a channel quality of a channel is less than or equal to a reference, if a data rate is less than or equal to a reference although a corresponding terminal is provided with a High Speed Uplink Packet Access (HSUPA) service, if a corresponding terminal is provided with all of a data service and a voice service, if a length of a frame is greater than or equal to a reference, if a receiver is a rake receiver, or if a resource is insufficient for calculating a channel quality premising an equalizer because an operation amount of the BS is greater than or equal to a reference despite the receiver using an equalizer.

5. The apparatus of claim 3, wherein the controller selects the second power control, if a corresponding terminal is provided with a data service, if a channel quality of a channel is greater than or equal to a reference, or if a receiver uses an equalizer.

6. The apparatus of claim 3, wherein the data service is a High Speed Uplink Packet Access (HSUPA) service.

7. The apparatus of claim 3, wherein the controller determines the existence or non-existence of the data service and the data rate by demodulating an Enhanced Data Channel-Transport Format Combination Indication (E-TFCI).

8. The apparatus of claim 3, wherein, if a system parameter (N_max_dpdch) is equal to '0', the controller determines that it is not simultaneously provided with the data service and a voice service.

9. The apparatus of claim 1, wherein the predefined pattern iterates a '+' command of increasing power and a '−' command of decreasing power.

10. The apparatus of claim 2, wherein the second generator generates a fourth power control command at the frame period using the channel quality premising the rake receiver, and wherein the modulator/demodulator (modem) transmits at least one of the first, second, third, and fourth power control commands.

11. The apparatus of claim 10, wherein the controller controls to transmit, at the frame period, the fourth power control command generated using the channel quality premising the rake receiver instead of the second power control command generated using the channel quality premising the equalizer, if a rake receiver is temporarily used so as to decrease an operation amount due to a burden of a reception operation amount of a BS or if an equalizer is used but an operation amount is needed to be decreased due to a burden of an operation amount of SNR determination.

12. The apparatus of claim 1, wherein, prior to generating the second power control command generated using the channel quality premising the equalizer, the second generator compensates the channel quality using the relationship between a determined channel quality and a channel quality of a channel.

13. The apparatus of claim 12, wherein the second generator selects an equation corresponding to a value of the channel quality, calculates the channel quality of the channel using the selected equation, and uses the channel quality of the channel as a compensated channel quality.

14. The apparatus of claim 13, wherein the equation is one of at least one or more equations corresponding to a range of at least one channel quality, and is a linear equation representing the relationship between the channel quality of the channel and the determined channel quality in a corresponding range.

15. A power control method of a Base Station (BS) in a wireless communication system, the method comprising:
    determining to apply one of a first power control in which power control commands are slot-periodically generated without information determined after receiving a frame, and a second power control in which power control commands are frame-periodically generated based on the information determined after receiving a frame;
    if the first power control is selected, generating a first power control command at a slot period using a channel quality premising a rake receiver;
    if the second power control is selected, generating a second power control command at a frame period using a channel quality premising an equalizer, and generating a third power control command according to a predefined pattern at a slot when the channel quality is unavailable; and
    transmitting at least one of the first, second, and third power control commands.

16. The method of claim 15, wherein the first power control is power control using the channel quality calculated premising the rake receiver, and
    wherein the second power control is power control using the channel quality calculated premising the equalizer.

17. The method of claim 16, wherein the determining to apply one of the first power control and the second power control comprises selecting one of the first power control and the second power control according to at least one of the existence or non-existence of a data service, a data rate, a length of a frame, simultaneous transmission or non-transmission of voice and signaling, the kind of receiver employed, and an operation amount of a BS.

18. The method of claim 17, wherein the selecting of one of the first power control and the second power control comprises,
    selecting the first power control, if a corresponding terminal is provided with only a voice service, if a channel quality of a channel is less than or equal to a reference, if a data rate is less than or equal to a reference although a corresponding terminal is provided with a High Speed Uplink Packet Access (HSUPA) service, if a corresponding terminal is provided with all of a data service and a voice service, if a length of a frame is greater than or equal to a reference, if a receiver is a rake receiver, or, if a resource is insufficient for calculating a channel quality premising an equalizer because an operation amount of the BS is greater than or equal to a reference despite the receiver using an equalizer.

19. The method of claim 17, wherein selecting one of the first power control and the second power control comprises,
    selecting the second power control, if a corresponding terminal is provided with a data service, if a channel quality of a channel is greater than or equal to a reference, or if a receiver uses an equalizer.

20. The method of claim 17, wherein the data service is a High Speed Uplink Packet Access (HSUPA) service.

21. The method of claim 17, wherein the existence or non-existence of the data service and the data rate are determined by demodulating an Enhanced Data Channel-Transport Format Combination Indication (E-TFCI).

22. The method of claim 17, wherein whether the data service and a voice service are simultaneously provided is determined using a system parameter (N_max_dpdch), and
    wherein, if the N_max_dpdch is equal to '0', it is determined that the data service and the voice service are not simultaneously provided.

23. The method of claim 15, wherein the predefined pattern iterates a '+' command of increasing power and a '−' command of decreasing power.

24. The method of claim 16, further comprising, if the second power control is selected, generating a fourth power control command at the frame period using the channel quality premising the rake receiver; and
    transmitting the fourth power control commands.

25. The method of claim 24, wherein the transmitting of the fourth power control commands comprises transmitting, at the frame period, the fourth power control command generated using the channel quality premising the rake receiver instead of the second power control command generated using the channel quality premising the equalizer, if a rake receiver is temporarily used so as to decrease an operation amount due to a burden of a reception operation amount of a BS or if an equalizer is used but an operation amount is needed to be decreased due to a burden of an operation amount of SNR determination.

26. The method of claim 15, further comprising:
    prior to generating the second power control command generated using the channel quality premising the equalizer, compensating the channel quality using the relationship between a determined channel quality and a channel quality of a channel.

27. The method of claim 26, wherein the compensating of the channel quality comprises,
    selecting an equation corresponding to a value of the channel quality;
    calculating the channel quality of the channel using the selected equation; and
    using the channel quality of the channel as a compensated channel quality.

28. The method of claim 27, wherein the equation comprises one of at least one or more equations corresponding to a range of at least one channel quality, and is a linear equation representing the relationship between the channel quality of the channel and the determined channel quality in a corresponding range.

\* \* \* \* \*